UNITED STATES PATENT OFFICE.

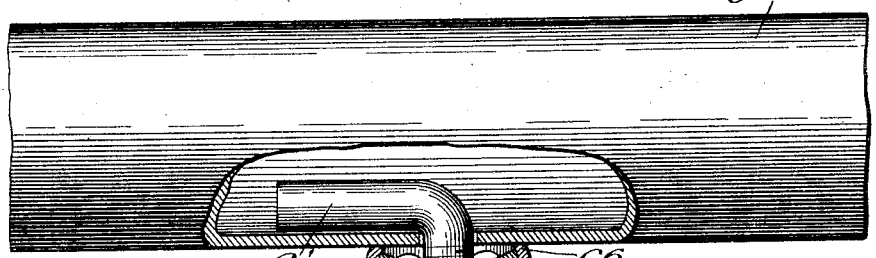
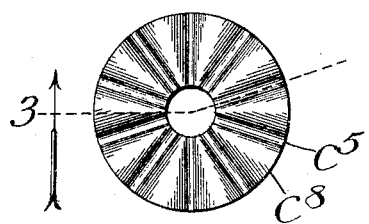
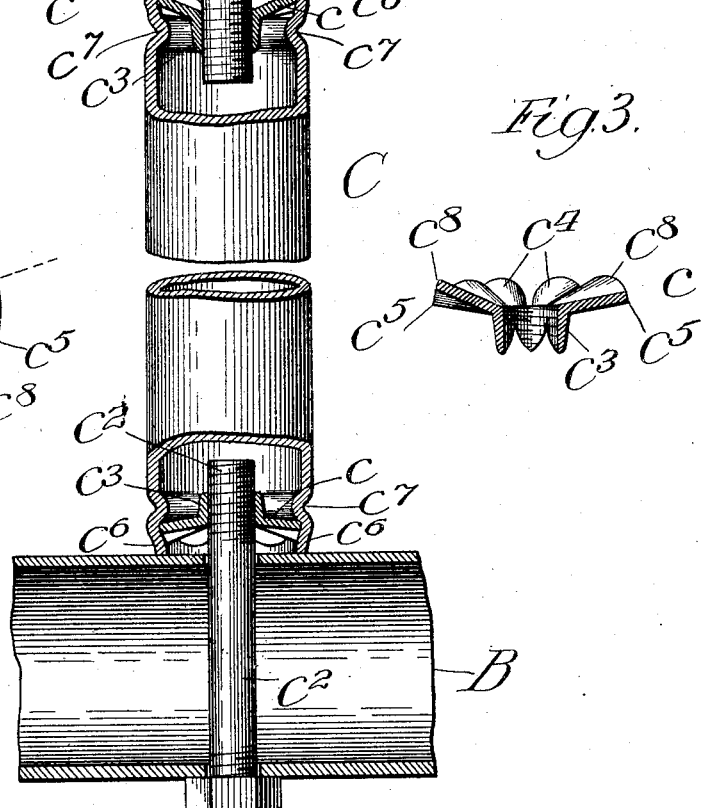
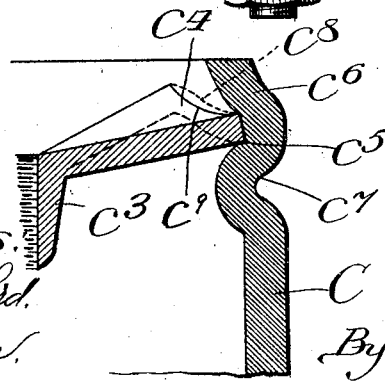

FRANCIS N. PALMER, OF KENOSHA, WISCONSIN.

METAL BED.

No. 796,671. Specification of Letters Patent. Patented Aug. 8, 1905.

Application filed March 20, 1905. Serial No. 251,139.

*To all whom it may concern:*

Be it known that I, FRANCIS N. PALMER, a citizen of the United States, residing at Kenosha, in the county of Kenosha and State of Wisconsin, have invented a new and useful Improvement in Metal Beds, of which the following is a specification.

My invention pertains particularly to the means for attaching the spindles of metal bedsteads to the supporting members, usually cross members.

My primary object is to provide a simpler, cheaper, and more durable construction than any construction heretofore known.

The invention is illustrated in the accompanying drawings, in which—

Figure 1 represents a broken sectional view of a portion of a bed-frame constructed in accordance with my improvement; Fig. 2, a plan view of a fastening member employed; Fig. 3, a section taken as indicated at line 3 of Fig. 2, and Fig. 4 an enlarged broken sectional view showing the manner in which the fastening member is secured in the tubular spindle.

In the construction shown A and B represent spindle-supporting members of a bed-frame, and C a spindle connected with said members by means of my improved fastening. The spindle is equipped internally at its opposite ends with fastening members $c$ of like construction. A bent bolt $c'$ and a straight bolt $c^2$ serve in a well-understood manner to connect the members $c$ to the members A and B.

Each member $c$ comprises a dished corrugated sheet-metal nut, formed by stamping and punching a sheet-metal disk to form a central perforate boss $c^3$ and radial corrugations $c^4$, extending from the boss to the periphery of the disk. The bosses are tapped or internally threaded to receive the threaded bolts, as indicated in Fig. 1. The bosses are on the convex sides of the disks and are turned inwardly or toward each other in the assembling operation.

In the assembling operation the nuts are forced into the ends of the tube, the corrugations producing wedge-like corners $c^5$, which are first presented to the interior of the tube and which serve to cut through any bur at the tube end, thus facilitating the insertion. After the nuts are in place the tube ends are struck by dies, which bends the metal in above and below the nuts, as indicated at $c^6$ $c^7$. In this operation the corners $c^5$ and the corresponding outer or upper corners $c^8$ of the nuts sink into the metal of the tube to a certain degree and some of the metal $c^9$ of the tube enters the depressions of the corrugations above and below the nut, as illustrated in Fig. 4, thereby securely locking the nut against rotation.

In the operation of forming the connection between the nuts and the cross members the nuts are subjected to great stress, which on account of the shape and disposition of the nuts serves to cause the nuts to grip both the bolts and the tube more tightly, thereby preventing stripping of the threads and loosening of the nuts. In addition to these evident advantages my construction is cheaper and in other respects better than the constructions heretofore known.

While the precise construction shown is preferred by me, it will be understood that minor changes within the spirit of my invention may be made. For instance, it is not necessary to dish the nut in the same degree as illustrated, and its shape may be otherwise altered. In my construction the extremities of the spindles present a finished appearance, which is a matter of importance.

What I regard as new, and desire to secure by Letters Patent, is—

1. The combination with the spindle-supporting members of a bed-frame, of a spindle having in its end an inwardly-dished nut, and a bolt entered in said nut, for the purpose set forth.

2. The combination with the spindle-supporting members of a bed-frame, of a spindle having in its end a sheet-metal nut provided at its inner side with a perforate internally-threaded boss, and a bolt entered in said nut, for the purpose set forth.

3. The combination with the spindle-supporting members of a bed-frame, of a spindle having in its end a radially-corrugated nut having at its inner side a perforate internally-threaded boss, and a bolt connecting said nut to one of said spindle-supporting members, for the purpose set forth.

4. A spindle for the purpose set forth, comprising a tube, and a nut inserted therein, the tube having its metal bent inwardly above and below the nut, means being provided to prevent rotation of the nut with relation to the tube, for the purpose set forth.

5. A spindle for the purpose set forth, comprising a tube, and a corrugated nut therein having a perforate internally-threaded boss at its inner side, for the purpose set forth.

FRANCIS N. PALMER.

In presence of—
    L. HEISLAR,
    J. H. LANDES.